PRECISION ELECTRONIC CURRENT AMPLIFIER AND INTEGRATOR

INVENTOR
*MERVAL W. OLESON*

BY James D Murray
R. A. Sciascia
ATTORNEYS

INVENTOR
MERVAL W. OLESON

BY James G. Murray
ATTORNEYS

PRECISION ELECTRONIC CURRENT AMPLIFIER AND INTEGRATOR

Filed Aug. 28, 1964 4 Sheets-Sheet 3

INVENTOR
MERVAL W. OLESON

BY James G. Murray
R. S. Sciascia
ATTORNEYS

INVENTOR
MERVAL W. OLESON

BY James G. Murray
R. S. Sciascia
ATTORNEYS

United States Patent Office 3,383,603

Patented May 14, 1968

3,383,603

PRECISION ELECTRONIC CURRENT AMPLIFIER AND INTEGRATOR

Merval W. Oleson, Temple Hills, Md.
(5018 Spring Drive, Washington, D.C. 20031)

Filed Aug. 28, 1964, Ser. No. 392,966
16 Claims. (Cl. 328—127)

ABSTRACT OF THE DISCLOSURE

An electrical circuit which can be used either as a precision integrator or a precision amplifier and which includes a voltage controlled oscillator section and a discriminator or an integrating discriminator section.

Figure 1:
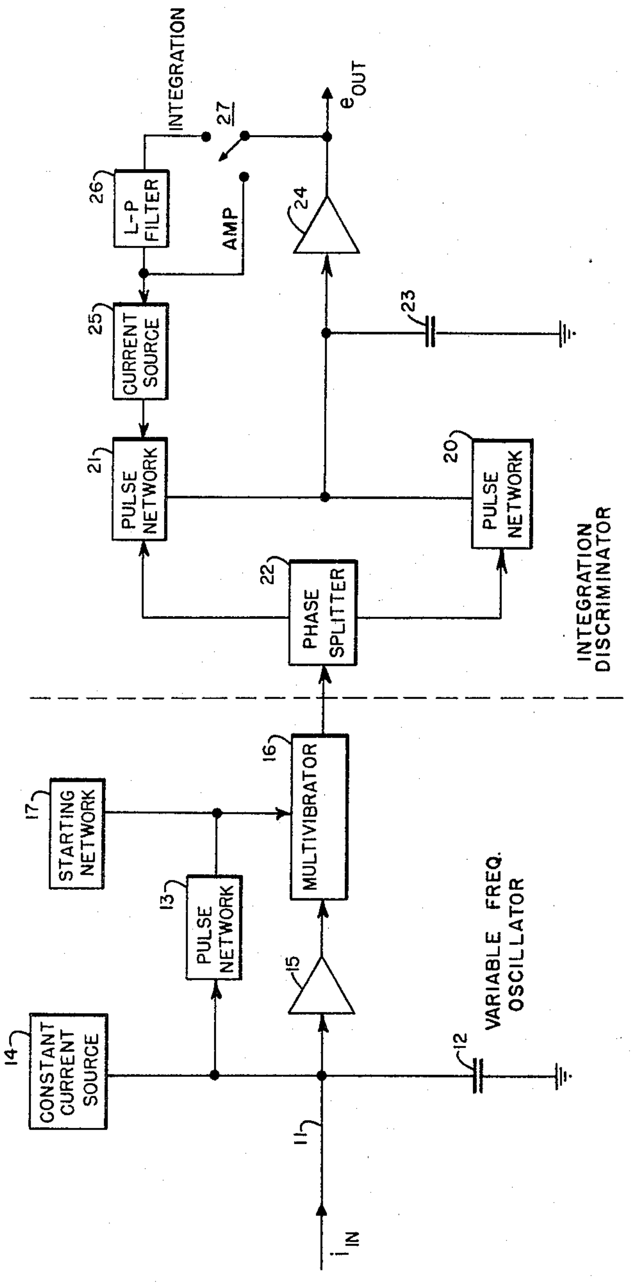

The invention described herein may be manufactured and used by or for the Government of the United States of America for governmental purposes without the payment of any royalties thereon or therefore.

This invention relates to an electrical circuit which can be used either as a precision integrator or as a precision amplifier and which, while of general utility, is particularly suitable for use with electrical signals conventionally associated with the investigation of structural response to mechanical shock. For use in data recording and telemetering applications the invention may be separated into functional sections consisting of a voltage controlled oscillator section and a discriminator or an integrating discriminator section.

Although the invention has been found to be useful in many other environments, it was developed primarily to satisfy a need arising in the field of investigation of structural response to mechanical shock, or, more simply, in mechanical shock investigation. In this field both theoretical considerations and contemporary practice emphasize the importance of velocity-time measurements. To this end much effort has been expended to develop velocity transducers, but, in general, these transducers have been less than completely satisfactory because of undesirable features relating to space requirements and to inherent limitations imposed as a result of the magnetic induction principle employed.

The concept of measuring with an acceleration transducer, such as an electrical strain gage, and subsequently integrating the acceleration signal, obviously has both theoretical possibilities and practical advantages. However, this alternate approach has not been generally and successfully exploited to date partially because the previously known circuitry is not capable of satisfactorily performing, with the necessary precision, the required integrations with the range of signal levels and the frequencies involved in mechanical shock studies. The circuit of the present invention was developed to fill the need for precision amplifiers and integrators capable of functioning in an accelerometer type system for studying structural response to mechanical shocks.

In the course of development, it was recognized that, by separation into functional sections, the present invention would also have great utility in the fields of magnetic tape recording, telemetering and computing systems. When so used, the invention also has the unique feature that, in contrast to presently known circuits, there is no need for complex low pass filtering of the output signal.

It is, therefore, an object of this invention to provide an electrical circuit which can be used either as a precision integrator or as a precision amplifier.

Another object is to provide an electrical circuit which can be used either as a precision integrator or as a precision amplifier and which, while of general utility is particularly suitable for use with electrical signals conventionally associated with the investigation of structural response to mechanical shock, data recording and telemetering.

A further object of this invention is to provide an electrical circuit which can be used either as a precision integrator or as a precision amplifier and which has excellent stability characteristics with changing ambient parameters, such as temperature, humidity, etc., and wherein the performance determining components are either inherently stable or are arranged to be cooperatively compensating for such changing ambient conditions as might be encountered during operational field measurement programs.

Yet another object is to provide a novel electrical circuit for delivering a fixed quantity of charge per cycle.

A still further object of the invention is to provide a precision integrating and amplifying circuit which does not require complex filtering of the output signal.

Figure 2:
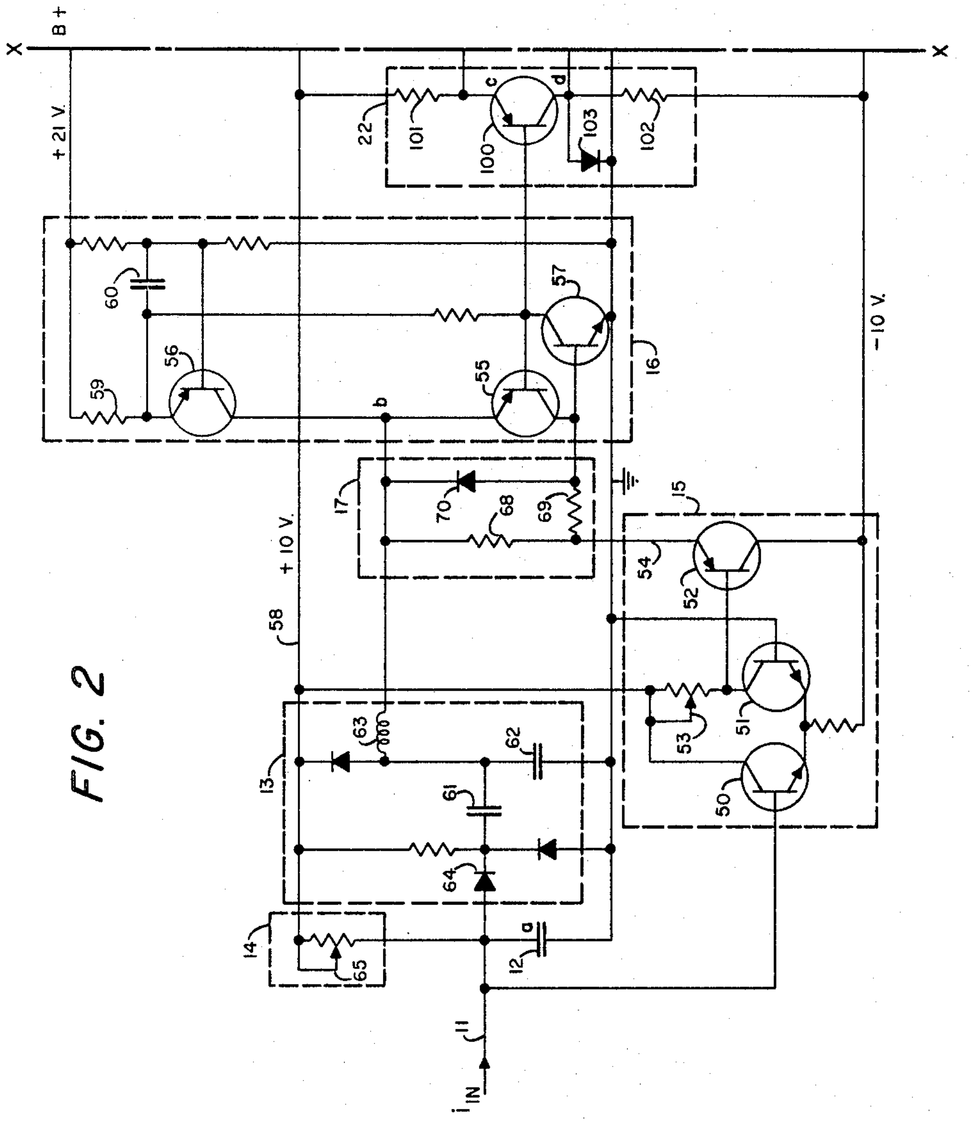
Figure 3:
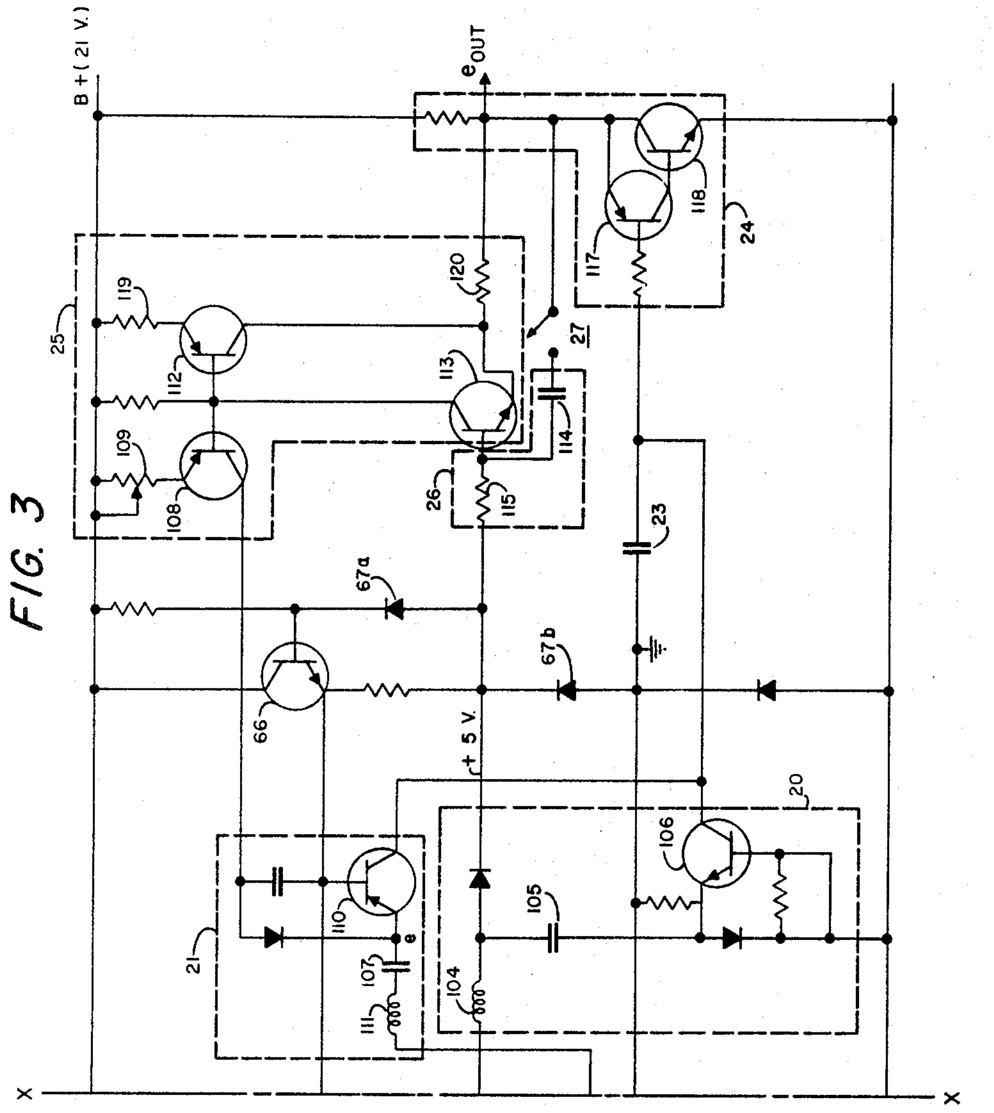

Other objects and advantages of the invention will hereinafter become more fully apparent from the following description and the annexed drawing, which illustrate an embodiment of the invention, and wherein:

FIG. 1 is a block diagram of the invention;

FIGS. 2 and 3, when joined, provide a circuit diagram of the invention, and

Figure 4:
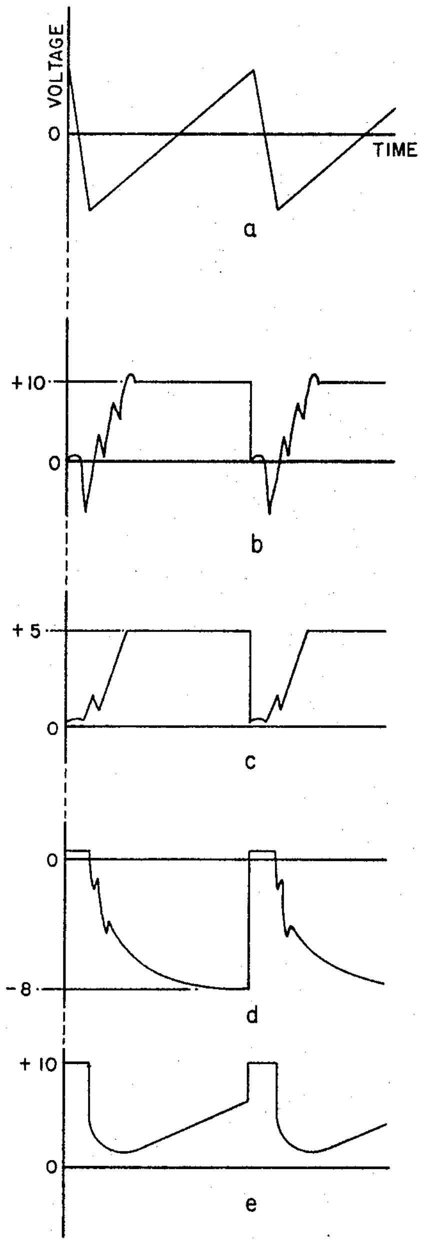

FIG. 4(*a–e*) illustrates certain wave forms which are helpful in understanding the operation of the invention.

Referring now to the drawings, wherein like reference numerals designate like or corresponding parts throughout the several figures, in FIG. 1 the invention is illustrated in block diagram form. The incoming signal, $i_{in}$, which could be any signal but which for the purpose of specificity shall be described as the signal arising from a strain gage circuit attached to a structure subjected to mechanical shock, is conducted to the circuit of the invention by conductor 11. The incoming signal is connected to charge capacitor 12 which is also connected to be charged by constant-quantity pulse network 13 and to be drained at a constant rate by constant current source 14. The net charge applied to capacitor 12 by conductor 11, pulse network 13 and current source 14 determines the voltage across the capacitor, which voltage is amplified by amplifier 15 and controls, at a precise amplitude, the triggering of monostable multivibrator 16, which in turn is connected to control the transfer of a fixed quantity of charge by pulse network 13.

It will be recognized that components 12–16 constitute a variable frequency oscillator. Control of the oscillator quiescent frequency is accomplished by varying the rate at which charge is removed by current source 14. The quiescent oscillator frequency is modulated by the incoming signal $i_{in}$. Starting network 17 has the function of preventing the oscillator from being permanently locked out of operation by accidental occurrence of an out-of-tolerance voltage across capacitor 12.

The oscillator can, as subsequently disclosed in more detail, be designed to functionally depend primarily on passive elements and to have excellent stability characteristics with respect to disturbances of the supply voltage and variations of ambient conditions, such as temperature and humidity.

Monostable multivibrator 16 also energizes constant quantity pulse network 20 and variable-charge pulse network 21 through phase splitting network 22, which also acts as a buffer and prevents loading of multivibrator 16.

In contrast with pulse network 20 which, for each cycle of multivibrator 16, supplies a specific quantity of negative charge to capacitor 23, the pulse network 21 supplies a variable quantity of positive charge to the same capacitor. The net charge supplied to capacitor 23 determines the output $e_{out}$ of the circuit. Unity amplifier 24 functions to isolate the circuit from loads connected to receive the output voltage $e_{out}$. The quantity of variable charge supplied by pulse network 21 is controlled both by the frequency of the oscillator 12–16 and by the output voltage $e_{out}$ acting through current source 25 and optionally through low pass filter 26. This filter is included in the circuit by switch 27 for operation as an integrator and is omitted when the circuit is used as an amplifier. When the oscillator 12–16 is operating at its quiescent frequency and the voltage $e_{out}$ is zero, the charge increments supplied by networks 20 and 21 are of equal magnitude but opposite polarity, thus producing no change of voltage across capacitor 23.

It will be apparent that pulse networks 20 and 21, which are designed to have identical pulse tranfer characteristics, simultaneously transfer opposite charge to capacitor 23 and as a result the transient components in the output voltage are minimized, thereby reducing the need, if any, for filtering the output signal.

As with the previously discussed oscillator section, the output section 20–27, as subsequentially disclosed in more detail, can be designed to have excellent stability characteristics with respect to changing ambient conditions. Such a result is obtainable by utilizing passive components as the primary stability controlling elements and arranging the secondary stability determining components to produce compensating effects during changing ambient conditions.

In operation, the circuit is initially calibrated so that, with no input signal, capacitor 12, pulse network 13 and current source 14 cooperatively drive multivibrator 16 at the quiescent frequency and at this frequency, the pulse networks 20 and 21 and the current source 25 cooperatively maintain the initial charge on capacitor 23 such that the output signal $e_{out}$ is zero. If an input signal $i_{in}$ is applied to conductor 11, the frequency of the oscillator will be modulated in a manner relating to the input signal. The changing oscillator frequency will not vary the quantity of charge transferred for each cycle of the oscillator by network 20 to capacitor 23. However, the quantity of charge transferred by pulse network 21 to capacitor 23 will vary with a changing oscillator frequency since this incremental charge is proportional to the rate current is supplied to pulse network 21 by current source 25 and to the period of the oscillator. The varying of the charge quantity per oscillator cycle delivered by pulse network 21 will cause a change in voltage to develop across capacitor 23, which voltage will appear as the output signal $e_{out}$.

It will be apparent that, when current source 25 supplies a constant current to pulse network 21, the average voltage across capacitor 23 will be proportional to the time integral of the input signal, the proportionality factor depending in large part on the design parameters of networks 13 and 20 and the size of capacitor 23. However, in an actual circuit the components will have less than perfect stability, a condition which would cause the upsetting of the initially calibrated circuit balance and ultimately result in undesirable large errors in the integrated output signal. To forestall this, the output voltage $e_{out}$ is fed back through switch 27 and low pass filter 26 to cause the rate of current from source 25 to vary in response to the long time average of the output voltage.

The circuit will function as an amplifier if the instantaneous value of the output signal is connected to control current source 25, that is, if the low pass filter 26 is by-passed by switch 27. When so arranged, the circuit gain is primarily determined by the design parameters of network 13 and current source 25.

In some applications it may be desirable to separate the circuit of FIG. 1 into sections wherein components 12–17 function as a voltage controlled oscillator and the remaining components function in a separate section as a discriminator or as an integrating discriminator.

Referring now to FIGS. 2 and 3 which, when joined, illustrate the circuit details of an embodiment of the invention. Several wave forms which are helpful in understanding the operation of the circuit of FIGS. 2 and 3 are illustrated in FIG. 4(*a–e*).

FIG. 4*a* shows the sawtooth wave form developed across capacitor 12, the frequency variation of which is directly related to the incoming signal on conductor 11. This wave form voltage is amplified by the differential amplifiers 50, 51 and emitter follower 52, which together with adjustment resistor 53 constitute amplifier 15 in FIG. 1. The resistor 53 controls the balance between the emitter-base voltages of transistors 50 and 51 to establish a zero value for the average value of the wave form of FIG. 4*a*. The most positive portion of the sawtooth wave form in FIG. 4*a* triggers the multivibrator 16, after which the voltage across capacitor 12 is quickly driven negative by the constant quantity of negative charge from network 13. After delivery of this negative charge, the voltage is slowly driven positive by the positive charge delivered by current source 14 and incoming signal $i_{in}$, the size of the latter determining the time it will take the voltage to reach the multivibrator triggering voltage, or in other words, the incoming signal modulates the multivibrator frequency.

Multivibrator 16 is stable in the "off" state wherein transistors 55 and 57 are non-conducting. The output of amplifier 15, which acts through conductor 54, causes the multivibrator 16 to be triggered to the "on" state wherein saturation conduction occurs in transistors 55 and 57, the current being drawn through transistor 56 from the B positive supply, which in the illustrated embodiment is 21 volts positive. In normal operation, multivibrator 16 is switched to "off" by the subsequently explained action of pulse network 13. However, in the absence of this action by network 13, a somewhat slower return of the multivibrator 16 to the "off" state is producted by the collector current of transistor 57 flowing through resistor 59 and capacitor 60 to cut off transistor 56, which in turn cuts off transistors 55 and 57.

The capacitors 61 and 62, inductor 63 and switching diode 64 constitute the novel pulse network 13 and function to transfer a fixed quantity of negative charge to capacitor 12 for every cycle of multivibrator 16. The inductor 63 and capacitors 12, 61 and 62 are tuned to a frequency such that the period for a half cycle is equal to the desired "on" period for multivibrator 16. During the "off" period the capacitors 61 and 62 are charged to the potential of conductor 58, typically 10 volts positive. Transition to the "on" state in multivibrator 16 has the effect of abruptly connecting these capacitors to near ground potential through coil 63 since conduction through transistors 55 and 57 is accompanied by a large reduction in the potential drop across these transistors. This abrupt drop in potential causes the discharge of capacitors 12, 61 and 62 through coil 63. This discharge, if unimpeded, would be in the form of a damped sine wave. However, in the disclosed circuit, while the first half cycle of discharge reinforces the current through transistor 55, the next half cycle stops conduction through this transistor and thereby returns the multivibrator 16 to the "off" state. The second, or reverse, half cycle is blocked from capacitor 12 by switching diode 64. A distinctive feature of this circuit is that the discharge current approaches zero at a high rate, thus insuring the accurate and stable cutoff of both multivibrator 16 nad diode 64. Since capacitor 12 is much larger than capacitor 61, the stable discharge of current through coil 63, in effect, transfers a precise quantity of negative charge to capacitor 12 for each cycle of multivibrator 16.

The discharge from capacitor 12 is replaced at a constant rate by positive current flowing through the adjustable resistor 65. This resistor is connected to lead 58 which is maintained at a regulated positive 10 volts by the functioning of transistor 66 and Zener diodes **67*a* and 67*b***. As indicated by FIGS. 2 and 3, the circuit of the illustrated embodiment is also connected to a B negative reference potential of minus 10 volts and to ground.

The regulated 10 volt positive lead 58 and resistor 65 constitute the constant current source 14 in FIG. 1.

It will be evident that the quiescent frequency of the oscillator 12–16 is primarily a function of capacitor 61 and resistance 65 and that of the quiescent frequency can be controlled by adjustment of the resistance. By selecting these elements from any of the capacitances and resistances known in the art to be temperature and humidity stable, the oscillator can be designed to possess excellent stability characteristics with respect to changing ambient conditions.

Under normal operating potentials, the positive base bias current for transistor 57 is supplied through resistors 68 and 69 acting as a load for emitter follower 52. Under unusual conditions, such as an unexpected large positive signal $i_{in}$, the transistor 52 emitter base diode may become reverse biased and the multivibrator 16 de-coupled from amplifier 15. In this event the multivibrator 16 becomes "free running," as a result of the operation of resistances 68 and 69 and pulse network 13, at a frequency of two to three times its normal quiescent frequency. Diode 70 is instrumental in controlling the free running conditions of multivibrator 16 by coupling the negative voltage transient, shown in FIG. 4*b*, which appears at the emitter of transistor 55 when the multivibrator "on" state is terminated, to the base of transistor 57. This, in effect, biases transistor 57 "off" for a long enough time to allow proper recovery of network 13 in the interval between multivibrator cycles and in turn a sufficiently large pulse discharge current to capacitor 12 for the amplifier 15 and multivibrator 16 to again become operationally coupled. Thus, the resistors 68 and 69 and diode 70 function as the starting network 17 in FIG. 1.

In the phase splitter 22, the transistor 100 is biased in a non-conducting state when the multivibrator 16 is in the "off" state by reason of the emitter back bias arising because the potential across non-conducting transistor 57 is larger than the regulated 5 volt positive potential on the emitter of transistor 100. After the transition of multivibrator 16 to the "on" state, the potential across transistor 57 and on the base of transistor 10 drops almost to zero and transistor 100 conducts strongly, thereby producing opposite phase signals across resistors 101 and 102. Phase splitter network 22 also serves to isolate the multivibrator 16 from the currents produced in pulse networks 20 and 21. The oppositely phased signals taken at the emitter and collector of transistor 100 are illustrated in FIGS. 4*c* and 4*d*. The diode 103 serves to conduct the excess emitter current of transistor 100 to ground during the multivibrator 16 "on" period.

The operation of constant-quantity pulse network 20 is similar to that of the previously described pulse network 13. The negative voltage signal, which originates on the emitter when transistor 100 conducts, causes the tuned circuit consisting of coil 104 and capacitor 105 to discharge, thereby in effect placing a fixed quantity of negative charge on capacitor 23. Since transistor 106 will not support a current reversal, only the first half cycle of current in the resonant circuit of coil 104 and capacitor 105 is transferred to capacitor 23. The period of this half cycle is adjusted to be very slightly less than the "on" period of transistor 100, therefore, shortly after the current transfer through transistor 106 is stopped, transistor 100 is returned to an "off" condition, capacitor 105 is recharged through resistance 101 and clamped to the regulated positive 5 volt potential.

The operation of pulse network 21, while similar in most respects to that of network 20, differs in the basic function in that a variable, not a fixed quantity of charge is transferred to capacitor 23 for each cycle of multivibrator 16. As illustrated in FIG. 4*e*, which is the voltage waveform at the emitter of transistor 110, the quantity of charge stored by capacitor 107 increases with the time between discharges since this capacitor is charged by a constant current source 25, which for the present can be considered to consist of transistor 108 and variable resistance 109. Upon the occurrence of a positive signal on the collector of transistor 100, as illustrated in FIG. 4*d*, the transistor 110 conducts for one half cycle at the frequency of the resonant circuit consisting of coil 111 and capacitor 107 which is resonant at the same frequency as the circuit of coil 104 and capacitor 105. This half cycle places a variable amount of positive charge on capacitor 23, the amount being inversely proportional to the frequency of the oscillator 12–16. The second, or reverse, half cycle does not occur because transistor 110 will not support reverse conduction. The resistor 109 is adjusted so that, when oscillator 12–16 is operating at its quiescent frequency, the charge delivered by pulse network 21 is equal to, but of opposed polarity to, that delivered by constant quantity pulse network 20.

While for the purpose of the preceding paragraph, the constant current source 25 was described as consisting solely of transistor 108 and variable resistance 109, it will be remembered that much previously it was set forth that in a practical circuit the rate of current from source 25 must be made proportional either directly, or through filter 26, to the output voltage. In the illustrated embodiment, this is accomplished by connecting the output voltage to the base of transistor 108 by means of transistors 112 and 113 which function as a unity gain amplifier. For operation as an integrator, the current source 25 is also controlled by connecting the output voltage through switch 27 and low pass filter 26, consisting of capacitor 114 and resistance 115, to the base of transistor 113. In this arrangement the transistors 112 and 113 act as a unity gain amplifier for only the very low frequency components of the output signal.

The output voltage $e_{out}$ is obtained from the net charge on capacitor 23 connected through unity gain amplifier 24 which includes complementary transistors 117 and 118 that function, in a known manner, as an improved cascaded emitter follower circuit.

It will be observed that when switch 27 is closed, the components 21, 23, 24, 25 and 26 constitute a closed feedback loop which includes two integrating elements, the capacitor 23 and the low pass filter 26. The overall transfer function of such a loop, which is the analog of a damped oscillatory system, has a characteristic low frequency resonance, above which the circuit behaves as an integrator and below which it behaves as an amplifier. Thus, when switched into the integrating configuration, the illustrated circuit will compensate for very low frequency components, such as would occur should changing ambient conditions upset the above described calibration by means of resistance 109. Moreover, all of the elements which primarily relate to circuit stability, such as capacitors 105 and resistors 109, 119 and 120, are passive and by selection of elements known to have stable temperature and humidity characteristics, the disclosed embodiment can, to a large degree, be made stable in respect to changing ambient conditions.

To attain maximum stability and performance of the disclosed invention, it will be obvious that, in addition to the previously enumerated passive components primarily related to stability, all of the circuit members should be chosen from components known to possess excellent environment stability characteristics. Persons skilled in circuit design will also recognize that the invention has, in many ways, been arranged to be self compensating for parameter changes arising from environmental changes. For example, the pulse networks 20 and 21 and the current source 25 are arranged to be self compensating for any change which might occur in the regulated positive 5 volt reference line.

By the foregoing, the invention has been disclosed in its broad aspects in relation to FIG. 1 while in FIGS. 2 and 3 a specific embodiment of the invention has been described. Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. An electronic circuit for providing an output signal which is proportional to the time integral of an input signal comprising:
variable frequency oscillator means connected to receive and be controlled by said input signal;
output signal capacitor means;
constant quantity pulse means connected to said output signal capacitor means and energized by said variable frequency oscillator means to deliver a fixed quantity of charge of one polarity to said output signal capacitor means for each cycle of said variable frequency oscillator means;
variable quantity pulse means connected to said output signal capacitor means and energized by said variable frequency oscillator means to deliver a variable quantity of charge of a polarity opposite to said one polarity to said output signal capacitor means for each cycle of said variable frequency oscillator means, said variable quantity of charge being related in size to the frequency of said variable frequency oscillator means
whereby the net charge delivered to said output signal capacitor means produces an output signal voltage which is proportional to the time integral of the input signal.

2. An electronic circuit as set forth in claim 1 wherein said fixed and variable quantities of charge are simultaneously delivered to said output signal capacitor in pulses of similar characteristics whereby transient voltages in said output signal are minimized.

3. An electronic circuit as set forth in claim 2 and further including a feedback path between said output signal capacitor means and said variable quantity pulse means, said feedback path including a low pass filter whereby the variable quantity of charge delivered by said variable quantity pulse means is also made proportional to said output signal.

4. An electronic circuit as set forth in claim 3 wherein said variable frequency oscillator means comprises:
input signal capacitor means connected to receive said input signal;
monostable multivibrator means connected to said input signal capacitor means to be triggered into an unstable condition whenever the net charge on said input signal capacitor means reaches a predetermined level;
a constant quantity pulse network connected to be energized by the triggering of said multivibrator means and connected to deliver a constant quantity of charge of a predetermined polarity to said input signal capacitor means for each triggering of said multivibrator means and
constant current source means connected to deliver charge of a polarity opposite to said predetermined polarity at a constant rate to said input signal capacitor means.

5. An electronic circuit as set forth in claim 4 wherein said constant quantity pulse means, said variable quantity pulse means and said constant quantity pulse network each include:
a tuned circuit comprising a coil and a capacitor;
charging means connected to said tuned circuit for charging said capacitor;
discharging means connected to said tuned circuit for discharging said capacitor and
blocking means connected to said tuned circuit for preventing recharging of said capacitor by oscillatory currents operatively associated with said discharge.

6. An electronic amplifier circuit wherein an input signal is amplified and provided as an output signal comprising:
variable frequency oscillator means connected to receive and be controlled by said input signal;
output signal capacitor means;
constant quantity pulse means connected to said output signal capacitor means and energized by said variable frequency oscillator means to deliver a fixed quantity of charge of one polarity to said output signal capacitor means for each cycle of said variable frequency oscillator means;
variable quantity pulse means connected to said output signal capacitor means and energized by said variable frequency oscillator means to deliver a variable quantity of charge of a polarity opposite to said one polarity to said output signal capacitor means for each cycle of said variable frequency oscillator means, said variable quantity of charge being related in size to the frequency of said variable frequency oscillator means;
a feedback path between said output signal capacitor means and said variable quantity pulse means
whereby the variable quantity of charge delivered by said variable quantity pulse means is also made proportional to the net charge delivered to said output signal capacitor means and the net charge delivered to said output signal capacitor means produces an output signal voltage which is proportional to the input signal.

7. An electronic amplifier circuit as set forth in claim 6 wherein said fixed and variable quantities of charge are simultaneously delivered to said output signal capacitor in pulses of similar characteristics whereby transient voltages in said output signal are minimized.

8. An electronic amplifier circuit as set forth in claim 7 wherein said variable frequency oscillator means comprises:
input signal capacitor means connected to receive said input signal;
monostable multivibrator means connected to said input signal capacitor means to be triggered into an unstable condition whenever the net charge on said input signal capacitor means reaches a predetermined level;
a constant quantity pulse network connected to be energized by the triggering of said multivibrator means and connected to deliver a constant quantity of charge of a predetermined polarity to said input signal capacitor means for each triggering of said multivibrator means and
constant current source means connected to deliver charge of a polarity opposite to said predetermined polarity at a constant rate to said input signal capacitor means.

9. An electronic amplifier circuit as set forth in claim 8 wherein said constant quantity pulse means, said variable quantity pulse means and said constant quantity pulse network each include:
a tuned circuit comprising a coil and a capacitor;
charging means connected to said tuned circuit for charging said capacitor;
discharging means connected to said tuned circuit for discharging said capacitor and
blocking means connected to said tuned circuit for preventing recharging of said capacitor by oscillatory currents operatively associated with said discharge.

10. An electronic circuit capable of being used as an integrator or as an amplifier and for providing an output signal which is selectively either the time integral of the input signal or is related in size to the input signal comprising:
variable frequency oscillator means connected to receive and be controlled by said input signal;
output signal capacitor means;
constant quantity pulse means connected to said output signal capacitor means and energized by said variable frequency oscillator means to deliver a fixed quantity of charge of one polarity to said output signal capacitor means for each cycle of said variable frequency oscillator means;

variable quantity pulse means connected to said output signal capacitor means and energized by said variable frequency oscillator means to deliver a variable quantity of charge of a polarity opposite to said one polarity to said output signal capacitor means for each cycle of said variable frequency oscillator means;

a feedback path between said output signal capacitor means and said variable quantity pulse means including a low pass filter and a switch for selectively including or excluding said low pass filter from said feedback path whereby when said low pass filter is included in the feedback path the net charge delivered to said output signal capacitor means produces an output signal voltage which is proportional to the time integral of the input signal and when said low pass filter is excluded from the feedback path the net charge delivered to said output signal capacitor means produces an output signal voltage which is proportional to the input signal.

11. An electronic circuit as set forth in claim 10 wherein said fixed and variable quantities of charge are simultaneously delivered to said output signal capacitor in pulses of similar characteristics whereby transient voltages in said output signal are minimized.

12. An electronic circuit as set forth in claim 11 wherein said variable frequency oscillator means comprises:

input signal capacitor means connected to receive said input signal;

monostable multivibrator means connected to said input signal capacitor means to be triggered into an unstable condition whenever the net charge on said input signal capacitor means reaches a predetermined level;

a constant quantity pulse network connected to be energized by the triggering of said multivibrator means and connected to deliver a constant quantity of charge of a predetermined polarity to said input signal capacitor means for each triggering of said multivibrator means and constant current source means connected to deliver charge of a polarity opposite to said predetermined polarity at a constant rate to said input signal capacitor means.

13. An electronic circuit as set forth in claim 12 wherein said constant quantity pulse means, said variable quantity pulse means and said constant quantity pulse network each include:

a tuned circuit comprising a coil and a capacitor;

charging means connected to said tuned circuit for charging said capacitor;

discharging means connected to said tuned circuit for discharging said capacitor and blocking means connected to said tuned circuit for preventing recharging of said capacitor by oscillatory currents operatively associated with said discharge.

14. A variable frequency oscillator connected to receive and be controlled by an input signal comprising:

input signal capacitor means connected to receive said input signal;

monostable multivibrator means connected to said input signal capacitor means to be triggered into an unstable condition whenever the net charge on said input signal capacitor means reaches a predetermined level;

a constant quantity pulse network connected to be energized by the triggering of said multivibrator means and connected to deliver a constant quantity of charge of a predetermined polarity to said input signal capacitor means for each triggering of said multivibrator means and constant current source means connected to deliver charge of a polarity opposite to said predetermined polarity at a constant rate to said input signal capacitor means whereby the frequency of the triggering of said multivibrator means is related to said input signal.

15. An integrating discriminator circuit for providing an output signal which is proportional to the time integral of the frequency deviation of an input signal comprising:

output signal capacitor means;

constant quantity pulse means connected to said output signal capacitor means and energized by said input signal to deliver a fixed quantity of charge of one polarity to said output signal capacitor means during each cycle of said input signal;

variable quantity pulse means connected to said output signal capacitor means and energized by said input signal to deliver a variable quantity of charge of a polarity opposite to said one polarity to said output signal capacitor means during each cycle of said input signal;

a feedback path including a low pass filter connected between said output signal capacitor means and said variable quantity pulse means whereby the net charge delivered to said output signal capacitor means produces an output signal voltage which is proportional to the time integral of the frequency deviation of said input signal.

16. An electronic circuit capable of being used as a discriminator or as an integrating discriminator and for providing an output signal which is selectively either proportional to the frequency deviation of an input signal or to the time integral of the frequency deviation of the input signal comprising:

output signal capacitor means;

constant quantity pulse means connected to said output signal capacitor means and energized by said input signal to deliver a fixed quantity of charge of one polarity to said output signal capacitor means during each cycle of said input signal;

variable quantity pulse means connected to said output signal capacitor means and energized by said input signal to deliver a variable quantity of charge of a polarity opposite to said one polarity to said output signal capacitor means during each cycle of said input signal;

a feedback path between said output signal capacitor means and said variable quantity pulse means including a low pass filter and a switch for selectively including or excluding said low pass filter from said feedback path whereby when said low pass filter is included in the feedback path the net charge delivered to said output signal capacitor means produces an output signal voltage which is proportional to the time integral of the frequency deviation of the input signal and when said low pass filter is excluded from the feedback path the net charge delivered to said output signal capacitor means produces an output signal voltage which is proportional to the frequency deviation of the input signal.

References Cited

UNITED STATES PATENTS

| | | | |
|---|---|---|---|
| 2,594,336 | 4/1952 | Mohr | 307—88.5 X |
| 2,776,369 | 1/1957 | Woodcock | 328—127 X |
| 3,258,605 | 6/1966 | Clark | 307—88.5 |
| 3,304,437 | 2/1967 | Dano | 307—88.5 |
| 3,304,439 | 2/1967 | Stratton et al. | 307—88.5 |
| 3,320,434 | 5/1967 | Ott | 307—88.5 |

JOHN S. HEYMAN, *Primary Examiner.*